US010008760B2

(12) United States Patent
Knapton et al.

(10) Patent No.: US 10,008,760 B2
(45) Date of Patent: Jun. 26, 2018

(54) ANTENNA METHOD AND APPARATUS

(71) Applicant: Dell Products, LP, Round Rock, TX (US)

(72) Inventors: Edward D. Knapton, Pflugerville, TX (US); Christopher M. Helberg, Austin, TX (US); Shawn P. Hoss, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days. days.

(21) Appl. No.: 14/447,819

(22) Filed: Jul. 31, 2014

(65) Prior Publication Data

US 2016/0037539 A1 Feb. 4, 2016

(51) Int. Cl.

| | |
|---|---|
| ***H04L 12/28*** | (2006.01) |
| ***H01Q 1/22*** | (2006.01) |
| ***H01Q 1/24*** | (2006.01) |
| ***H01Q 1/42*** | (2006.01) |
| ***H01Q 21/20*** | (2006.01) |

(52) U.S. Cl.

CPC ............. *H01Q 1/2266* (2013.01); *H01Q 1/22* (2013.01); *H01Q 1/24* (2013.01); *H01Q 1/246* (2013.01); *H01Q 1/42* (2013.01); *H01Q 21/205* (2013.01)

(58) Field of Classification Search

USPC .......... 370/242–347; 343/702–767, 841–890
See application file for complete search history.

(56) References Cited

U.S. PATENT DOCUMENTS 5,345,807 A 9/1994 Butts et al.
5,434,566 A 7/1995 Iwasa et al.
5,515,040 A 5/1996 Lee et al.
5,543,811 A * 8/1996 Chethik ................. H01Q 21/28 343/844
5,574,858 A 11/1996 Witte
5,790,102 A 8/1998 Nassimi
5,999,145 A * 12/1999 Niekamp ............. H01Q 1/1242 343/800

(Continued)

FOREIGN PATENT DOCUMENTS

WO WO 2012/112275 A1 8/2012

OTHER PUBLICATIONS

"Wieson's P-SENSOR Efficiently Reduce the SAR from Handheld Device," Wireless Application Business Unit, May 14, 2012, 2 pgs., http://www.wieson.com/go/en/wieson/news_show.php?nid=12392&catalog=Product%20News.

(Continued)

*Primary Examiner* — Man Phan

(74) *Attorney, Agent, or Firm* — Prol Intellectual Property Law, PLLC; H. Kenneth Prol

(57) ABSTRACT

An information handling system includes a triangular chassis and a plurality of antennas that provide optimized coverage in all directions around the triangular chassis. An antenna may be operated from each vertex of the triangular shaped base chassis. Alternatively, an antenna may be operated from each of three main side surfaces of the triangular shaped base chassis. One or more of the antennas can be selected for communication based on the ability to communicate with external network components. Disclosed systems provide omnidirectional coverage around the triangular chassis while minimizing the effects of shadowing caused by abase chassis.

20 Claims, 9 Drawing Sheets

(56) References Cited

U.S. PATENT DOCUMENTS 6,088,003 A * 7/2000 Bassirat ................ H01Q 1/246
343/890
6,091,364 A * 7/2000 Murakami ............ H01Q 1/084
343/700 MS
6,098,184 A 8/2000 Patterson, Jr.
6,107,997 A 8/2000 Ure
6,135,886 A 10/2000 Armstrong
6,166,723 A 12/2000 Schena et al.
6,281,846 B1 * 8/2001 Puente Baliarda ...... H01Q 1/36
343/700 MS
6,587,093 B1 6/2003 Shaw et al.
6,593,898 B2 * 7/2003 Sohn .................... H04B 7/0491
343/844
6,677,913 B2 * 1/2004 Engargiola ............ H01Q 11/10
343/792.5
7,024,625 B2 4/2006 Shali
7,136,045 B2 11/2006 Rosenberg et al.
7,463,201 B2 * 12/2008 Chiang .................... H01Q 1/24
343/702
7,589,674 B2 * 9/2009 Anagnostou ........... H01Q 9/285
343/700 MS
7,710,397 B2 5/2010 Krah et al.
7,817,135 B2 10/2010 Shaw et al.
7,821,732 B2 * 10/2010 Komura ................. G11B 5/314
360/59
8,035,616 B2 10/2011 Shaw et al.
8,243,018 B2 8/2012 Farag et al.
8,577,289 B2 11/2013 Schlub et al.
9,214,738 B2 * 12/2015 Yehezkely ......... H01Q 21/0006
2009/0140985 A1 6/2009 Liu
2010/0127983 A1 5/2010 Irani et al.
2010/0148999 A1 6/2010 Casparian et al.
2010/0201626 A1 8/2010 Krah et al.
2010/0321301 A1 12/2010 Casparian et al.
2011/0169709 A1 * 7/2011 Cooper .................. H01Q 1/246
343/841

OTHER PUBLICATIONS

"802.11n Demystified—Key considerations for n-abling the Wireless Enterprise," Motorola White Paper, 802 11nDEM_WP_v4_0209, 12 pgs, Feb. 2009, http://www.motorolasolutions.com/web/Business/_Documents/White%20Paper/_Static%20files/802%2011nDEM_WP_v4_0209.pdf.

* cited by examiner

ANTENNA METHOD AND APPARATUS

FIELD OF THE DISCLOSURE

The present disclosure generally relates to information handling systems, and more particularly to antenna systems optimized for a triangular chassis of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Information handling systems communicate with each other and other networked components using connections that can be wired, wireless, or some combination. For wireless communications, information handling systems often include an antenna.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. The use of the same reference symbols in different drawings indicates similar or identical items.

An information handling system such as a computer may include a generally triangular shaped base chassis. If the triangular shaped chassis is made of metal, or otherwise has characteristics that impede the penetration of electromagnetic energy, wireless communications between the information handling system and other network components may be affected. Disclosed embodiments relate to placement of antennas on or about a triangular shaped base chassis to maximize the effectiveness of wireless communication to and from the information handling system. For example, antennas may be placed at each vertex of a triangular shaped base chassis. Placing antennas at the peaks of a triangular chassis can help to minimize the mass of metal that each antenna must operate against, and therefore optimize antenna gain. Further, such placement may minimize the effect of shadowing, and allow each antenna to operate in a field strength pattern with a relatively high signal-to-noise ratio. The attached Figures illustrate features of disclosed embodiments for an antenna system for a triangular chassis.

Figure 1:
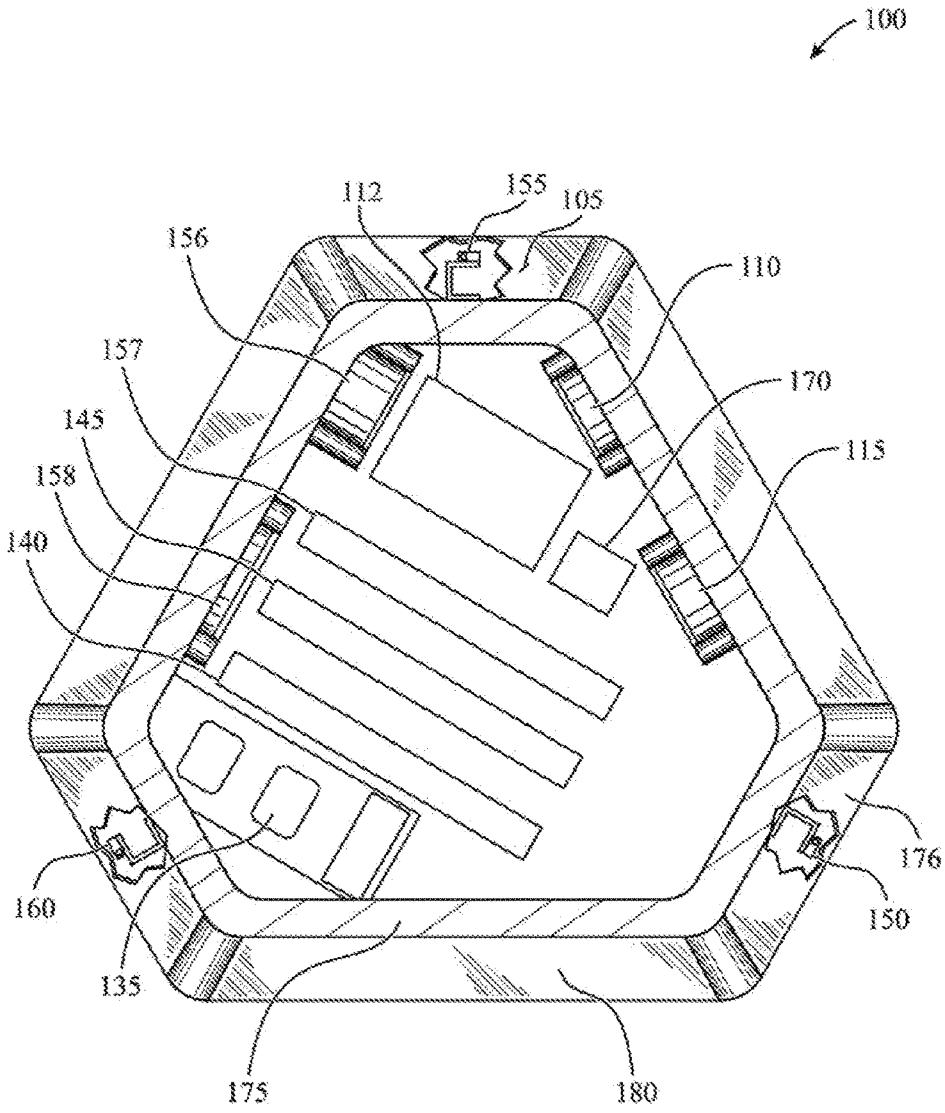
FIG. 1 illustrates a front view depicting aspects of an information handling system having a triangular shaped base chassis and an antenna system in accordance with an embodiment of the present disclosure.

FIG. 1 illustrates a portion of an information handling system 100 including a triangular shaped base chassis and antennas configured in accordance with a disclosed embodiment. For purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a game console, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a stylus, a touchpad, a keyboard, a mouse, and a video display. Information handling system 100 can also include one or more buses operable to transmit information between the various hardware components.

FIG. 1 depicts a front profile of information handling system 100, which includes chassis 105 with internal components CPU 112, power supply unit (PSU) 135, radio 170, graphics cards 140, 145, and 157, and fans 110, 115, 156, and 158. Chassis 105 is part of the external structure of information handling system 100. Chassis 105 includes a base chassis 175 that is metallic and a plastic chassis assembly 180. Base chassis 175 is partially or entirely hidden by plastic chassis assembly 180. Antennas arranged according to disclosed embodiments may be positioned between base chassis 175 and plastic chassis assembly 180. Plastic chassis assembly 180 may include voids or pockets to house antennas arranged in accordance with disclosed embodiments.

As seen in FIG. 1, chassis 105 is generally triangular shaped. A generally triangular shape may include, for example, one with chamfered bevels such as those shown in FIG. 1. Although the front profile of chassis 105 (FIG. 1) has six sides (i.e., three main sides and three chamfered bevels), the six-sided chassis in FIG. 1 has a generally triangular shape for purposes of disclosed embodiments, due to the three main sides, which are significantly larger than the beveled or chamfered edges. In the embodiment of FIG. 1, the triangle is equilateral. In other embodiments, a chassis of an information handling system may have the shape of a non-equilateral triangle. As shown, the vertices of the triangular chassis are chamfered, or squared off. Vertex 176 is illustrated as a chamfered vertex to provide a surface on which to mount antenna 150.

Information handling systems often connect wirelessly to other devices for communication. Accordingly, information handling system 100 communicates wirelessly using radio 170, to send and receive information (e.g., digital data) over antennas 150, 155, and 160. In some embodiments, to the extent possible, antennas 150, 155, and 160 are designed as isotropic radiators and are intended to radiate power uniformly in all directions. Accordingly, one or more of antennas 150, 155, and 160 may be omnidirectional in embodied systems. In some embodiments, each antenna 150, 155, and 160 is oriented horizontal to the surface on which chassis 105 sits (i.e., oriented along an axis extending into the page) and enabled for emanating electromagnetic energy omnidirectionally away from chassis 105. As non-limiting examples of embodiments, antennas 150, 155, and 160 each maybe configured as a looped conductor antenna, a dipole antenna, a ground plane antenna, or half wave antenna. As shown, antenna 155 is outside metallic portion 175 and within or inside plastic portion 180.

Antennas 150, 155, and 160 are communicatively coupled to radio 170 through conductors or transmission lines (e.g., conductors, coaxial cables or waveguides), which are not depicted in FIG. 1 for clarity. Radio 170 may include well-known radio electronics (e.g., transmitters, receivers, transceivers, encoders, decoders, signal generators, amplifiers, etc.) used for sending and receiving information over antennas 150, 155, and 160. Radio 170 may be an off-the-shelf module, and may be include electronics for communicating over a local area network (LAN) to exchange data or connect to the internet using 2.4 GHz and 5 GHz radio waves, for example. Radio 170 also may be enabled to implement well-known wireless technology standards for UHF and ISM bands including 2.4 to 2.485 GHz. In this way, information handling system 100 uses antennas 150, 155, and 160 for two-way communication with an electronic device that is external to chassis 105, such as a router or other information handling system in another room. Using antennas 150, 155, and 160, communications with other devices may occur in all directions (e.g., above, below, or to the side of information handling system 100). In some embodiments, the physical characteristics (e.g., length) of antennas 150, 155, and 160 may be optimized to send and receive electromagnetic energy with a wavelength of approximately 12.5 cm for 2.4 GHz and 6 cm for 5 GHz, particularly for some local area network applications. Antennas 150, 155, and 160 may be omnidirectional, directed, sectored, or otherwise configured to achieve coverage goals.

When chassis 105 includes a material (e.g., steel) that prevents good penetration of electromagnetic energy, communication from antennas 150, 155, and 160 may be impaired in certain directions. Accordingly, the arrangement (i.e., relative position of each antenna to the other) of antennas 150, 155, and 160 shown in FIG. 1 tends to prevent nulls (e.g., a zone within which the effective radiated power is at a minimum).

For a particular communication scenario, embodied systems may monitor the effectiveness of each antenna and select an antenna to use based on the monitoring. For example, if information handling system 100 is communicating with a router (not depicted) in a nearby room (not depicted), radio 170 may include software logic (e.g., computer code executed by a processor within radio 170) that tests the operational effectiveness of antennas 150, 155, 160 to determine which antenna is most effective at communicating with the router. If radio 170 determines that antenna 150 is receiving the strongest or highest-quality signal from the router, then radio 170 may select antenna 150 for communicating with the router to the exclusion of antennas 155 and 155. In other embodiments, all three antennas may receive or send two or more parallel streams simultaneously.

Figure 2:
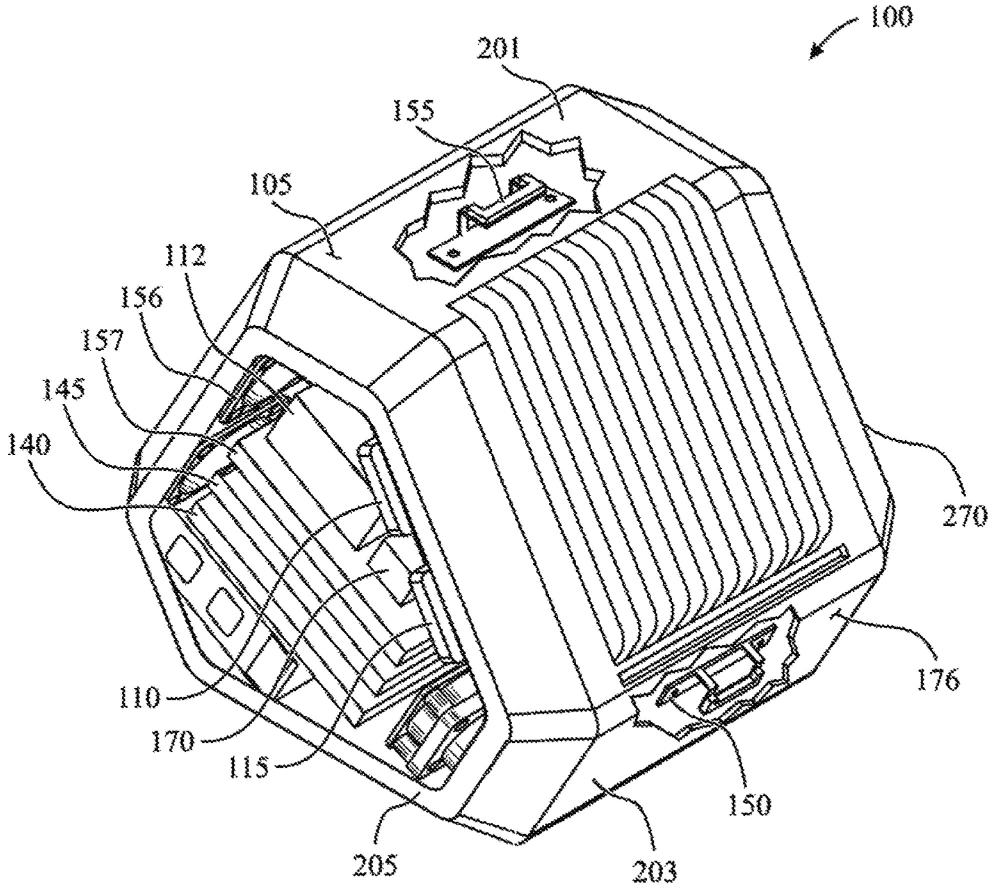
FIG. 2 illustrates an isometric view depicting aspects of the information handling system from FIG. 1.

FIG. 2 depicts an isometric view of information handling system 100 from FIG. 1. Again as shown in FIG. 2, again as shown in FIG. 2 via opening 252, chassis 105 houses graphics cards 140, 145, and 157. Likewise, FIG. 2 depicts CPU 112, radio 170, and fans 110, 115, and 156. As shown, vertex 176 includes a flat surface 203 on which to mount antenna 150. Likewise, antenna 155 is mounted to the top vertex 201 of information handling system 100. Antenna 150 is positioned at vertex 176 to run in a direction from the chassis front 205 to the chassis back 270. In other embodiments, the number and placement of antennas on or about a triangular chassis may differ from the embodiment of FIGS. 1 and 2. Moreover, compared to what is depicted in FIGS. 1 and 2, it is understood that the locations of other components (e.g., CPU 112, radio 170, etc.) may vary in other embodiments.

Figure 3:
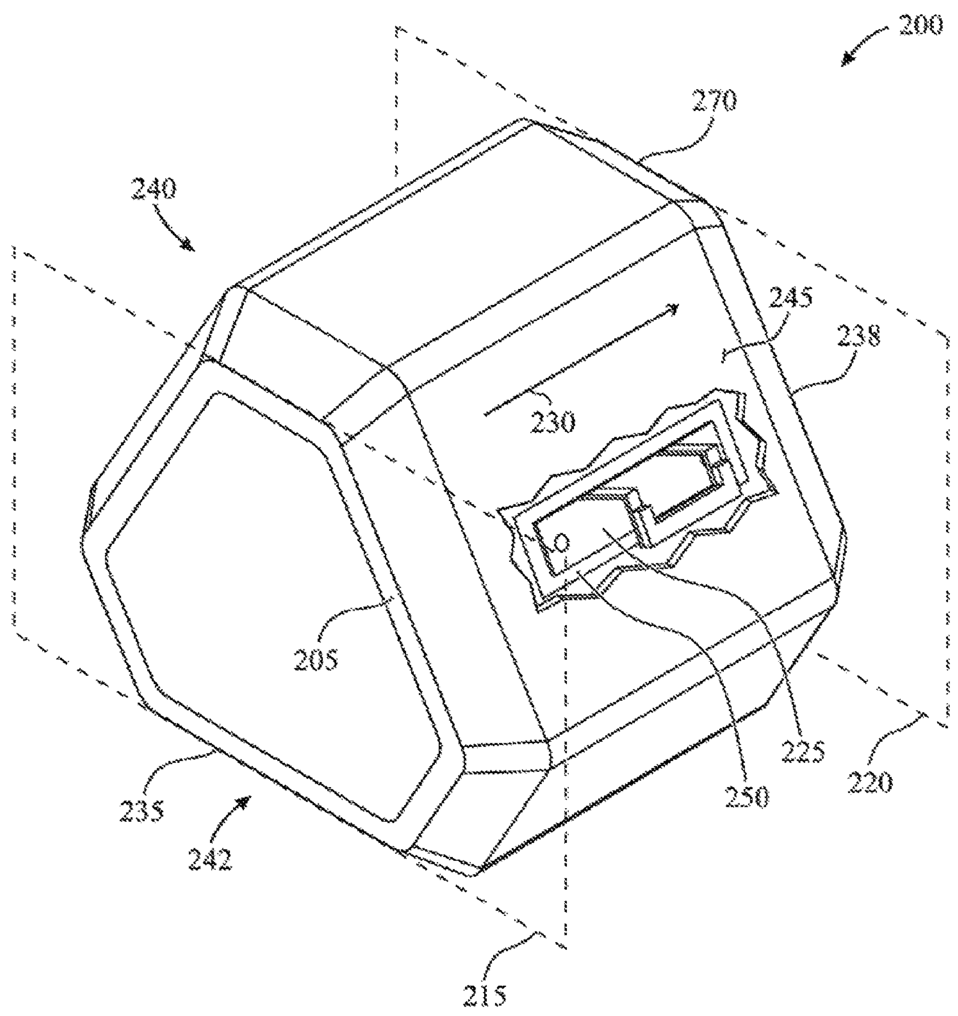
FIG. 3 illustrates an isometric view depicting aspects of an information handling system having an alternative antenna location compared to the information handling system from FIG. 1, in accordance with a further embodiment of the present disclosure.

FIG. 3 depicts additional aspects of antenna placement for some embodiments. FIG. 3 shows chassis 200 having a front 205 and a back 270. As shown, front 205 is aligned with plane 215 to form a front profile 235 of chassis 200. As shown, back 270 is aligned with plane 220 to form a back profile 238 which represents the part of back 238 that intersects with plane 220. Antenna 225 runs in a direction 230 in a direction from front 205 to back 238. As shown, antenna 225 is located proximate to main chassis surface 245 and includes reflector 250. Similarly, other antenna elements (not depicted) would be located symmetrically about chassis 200, proximate to base chassis surface 240 and base chassis surface 242 in some embodiments. The location of antenna elements may be substantially opposite one another on the base chassis. For example in FIG. 3, there would be another antenna (hidden) that was substantially opposite antenna 225 on chassis surface 240. In addition, in FIG. 1, there could be an embodied antenna (not depicted) installed substantially opposite antenna 155 to the main surface (i.e., non vertex) of the base chassis.

The systems shown in FIGS. 1, 2, and 3 are for illustration purposes and not intended to restrict the subject matter of the claims to what is shown. For example, embodied systems and methods may employ additional antennas compared to what is depicted in FIGS. 1, 2, and 3 to enhance performance by preventing dead zones or nulls in coverage areas. In such embodiments, radio electronics (e.g. radio 170 in FIG. 1) or a central processing unit (e.g. CPU 112 in FIG. 1) may select one or more antennas for communication, in some cases, after determining which antennas are best suited for communicating with external devices (e.g., a router in another room).

Figure 4:
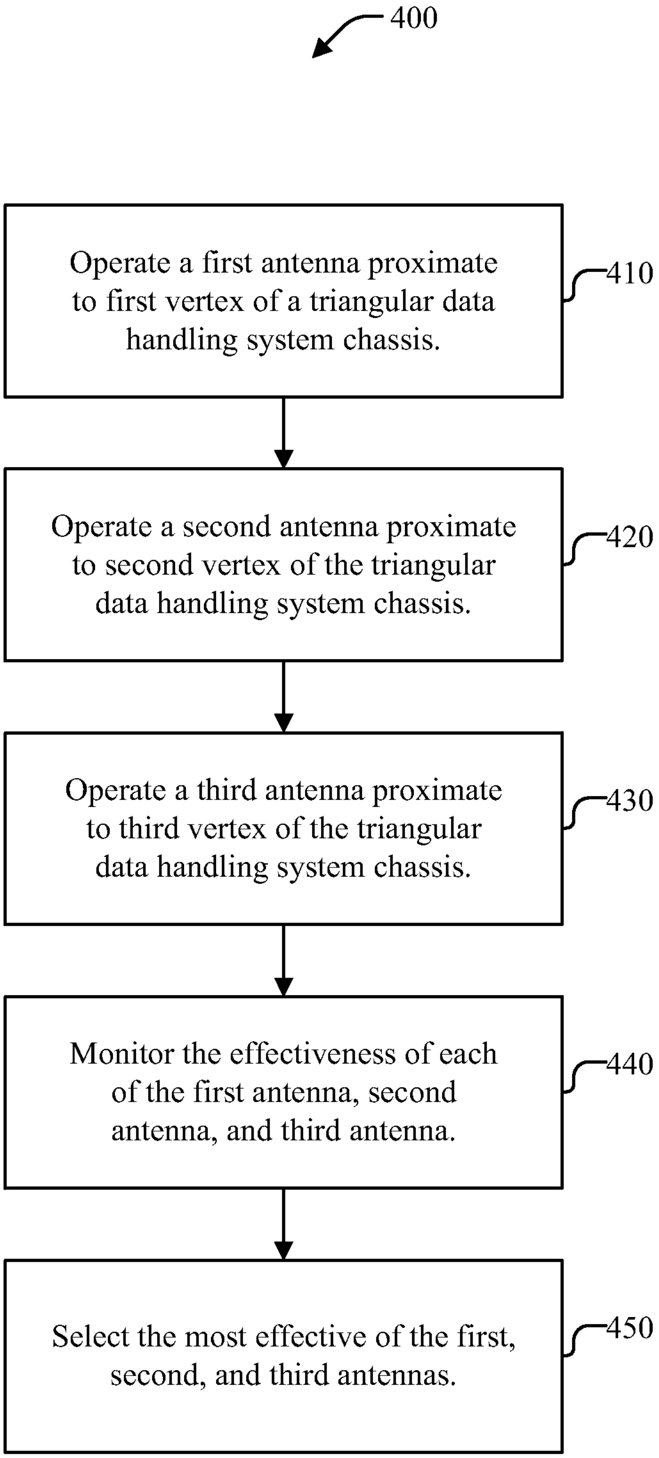
FIG. 4 illustrates a flow diagram illustrating a processor-based communication method for an information handling system according to an embodiment of the present disclosure.

FIG. 4 is a flow diagram of method 400 for operating a set of antennas (e.g., antennas 150, 155, and 160 in FIG. 1) in accordance with disclosed embodiments. Method 400 may be performed by a processor (e.g., processors 902/904 in FIG. 9, CPU 812 in FIG. 8, or CPU 112 in FIG. 1) executing machine readable instructions or code stored on a tangible medium such as a memory (e.g., memory 920 in FIG. 9). Accordingly, each of the blocks in method 400 may correspond to software code executed by a processor.

Block 410 represents operating a first antenna that is proximate to (e.g., at or near) a first vertex of a triangular information handling system chassis. Operating the first antenna may include sending, receiving, or both sending and receiving. For example, CPU 112 (FIG. 1) may cause radio 170 to encode and send information (e.g., digital data) to antenna 150 in accordance with block 410 (FIG. 4). Block 420 relates to operating a second antenna proximate to a second vertex of the triangular information handling system chassis. For example, CPU 112 (FIG. 1) may execute machine-readable instructions and prompt radio 170 to operate (e.g., send or receive digital data through) antenna 155 (FIG. 1). Block 430 similarly includes operating a third antenna proximate to a third vertex of the triangular information handling system chassis. For example, CPU 112 (FIG. 1) may instruct radio 170 (FIG. 1) to send digital data through antenna 160 (FIG. 1).

Block 440 relates to monitoring the effectiveness of each of the first, second and third antennas. For example, CPU 112 (FIG. 1) may execute machine readable instructions stored on physical medium (e.g., a memory, disk, etc.) to measure signal strength of signals received on each of antennas 150, 155, and 160. In some embodiments, metrics other than signal strength can be used to monitor the effectiveness of each antenna. For example, an embodied system may measure the effective data rate, signal-to-noise ratio, error rate, and other parameters related to the effectiveness of a communication path including each antenna.

Block 450 relates to selecting one of the first, second, and third antennas. As an example, CPU 112 (FIG. 1) may implement this block by selecting antenna 150 (FIG. 1) for communications with an external network component (e.g., a remote information handling system, router, gateway, etc.) if antenna 150 (FIG. 1) is deemed most effective in block 440 (FIG. 4) compared to other antennas.

Figure 5:
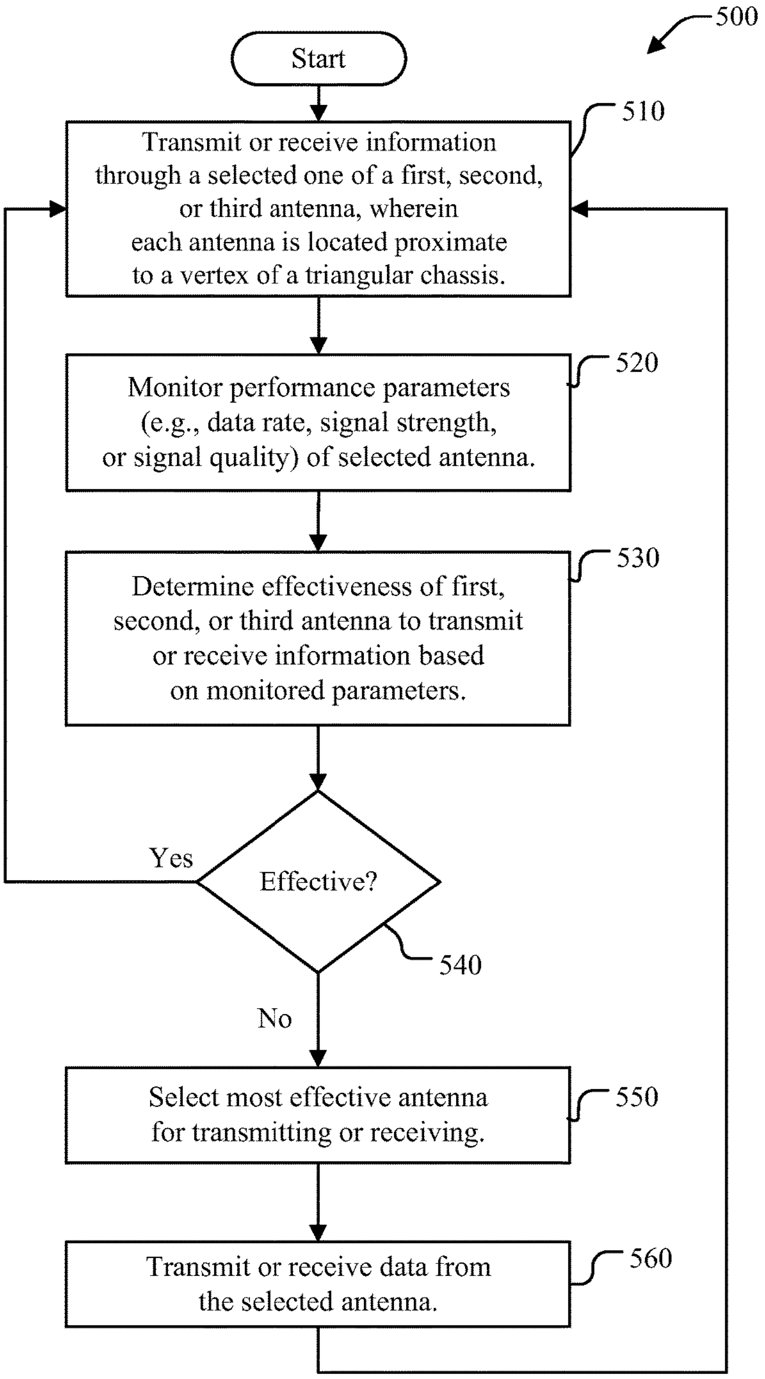
FIG. 5 illustrates a further flow diagram illustrating a processor-based communication method for an information handling system according to an additional embodiment of the present disclosure.

FIG. 5 shows a flow diagram of a processor implemented method 500 for operating a set of antennas that are associated with an information handling system having a generally triangular chassis as previously discussed. As shown, block 510 relates to transmitting or receiving information through a selected first, second, or third antenna. In block 510, each antenna is located proximate to (e.g., at or near) a vertex of a triangular chassis. For example, antenna 150 (FIG. 1) is proximate to (i.e., installed at or on) chamfered vertex 176 (FIG. 1). In accordance with block 510 (FIG. 5) antenna 150 (FIG. 1) would either be used to send or receive information via RF signaling for the information handling system. Antenna 150 (FIG. 1), in accordance with block 510 (FIG. 5), would be selected for transmission or reception by the information handling system. Antenna 155 (FIG. 1) and 160 (FIG. 1) may also be selected for simultaneous transmission or reception in accordance with block 510 (FIG. 5). Each of these antennas may be selected according to a transmission scheme implemented by radio electronics (e.g. radio 170 in FIG. 1) or a processor (e.g. CPU 112 in FIG. 1).

Block 520 (FIG. 5) relates to monitoring performance parameters of the selected antenna. Nonlimiting example performance parameters consistent with block 520 include data rate, signal strength, signal-to-noise ratio, and signal quality. Monitoring of performance parameters may be accomplished by the radio electronics portion of an information handling system (e.g., radio 170 in FIG. 1) or a central processor (e.g., CPU 112 in FIG. 1). As an example, radio 170 (FIG. 1) could perform block 520 by executing machine readable instructions for monitoring the quality of a two-way communication link including antenna 150 (FIG. 1) and an external network element (e.g., a router, not depicted). Radio 170 (FIG. 1), in accordance with block 520 (FIG. 5), could determine the signal strength associated with radio transmissions received from the network component over antenna 150 (FIG. 1).

Block 530 (FIG. 5) relates to determining the effectiveness of the first, second, or third antenna to transmit or receive information based on monitored parameters. Continuing the above example, radio 170 (FIG. 1) may determine whether the signal-to-noise ratio for incoming radio signals over antenna 150 (FIG. 1) is within a threshold of acceptable levels. To accomplish block 530 (FIG. 5), radio 170 (FIG. 1) could test and compare the effectiveness of each antenna (e.g., antenna 155, antenna 160, and antenna 150). To accomplish this, radio 170 (FIG. 1) may include a processor (not depicted) executing machine readable instructions that request a test signal from an external router (not depicted), which is received on all three antennas. In accordance with block 530 (FIG. 5), radio 170 (FIG. 1) determines which of the three antennas, under then current conditions, was best suited for communicating with the external router.

In block 540 (FIG. 5), if the selected antenna is effective, then block 540 includes cycling back to block 510 (FIG. 5) to further transmit or receive information to or from the selected antenna. Continuing the above example, if radio 170 (FIG. 1) determines that antenna 150 (FIG. 1) has ample ability to receive communications from the external router (not depicted) (e.g., because the signal-to-noise ratio exceeds a threshold), then block 540 (FIG. 5) includes continuing to receive information through the antenna. To determine whether a threshold was exceeded, a CPU could also, for example, compare measured signal strength to levels of signal strength known to accomplish robust communication.

If in block 540 (FIG. 5) it is determined that the selected antenna is not effective, block 550 includes selecting the most effective antenna of the three antennas for transmitting or receiving. In block 530 (FIG. 5), the effectiveness of each of the first, second, and third antennas may be ranked. For example, the signal strength, signal-to-noise ratio, traffic level, or other parameters for each antenna may be measured and ranked by a processor (e.g., CPU 112 in FIG. 1) or by radio electronics (e.g., radio 170 in FIG. 1). The central processor (e.g., CPU 112 in FIG. 1) may use the ranking of each antenna, based on one or more characteristics or measured qualities of the antennas, to select the most effective antenna for transmitting or receiving. Block 530 (FIG. 5) may include ranking each of the three antennas separately according to its ability to either transmit or receive. For example, an embodied system performing block 530 (FIG. 5) may determine that antenna 150 is effective the transmitting, and in block 530 (FIG. 5) may determine that antenna 155 (FIG. 1) is effective at receiving. Accordingly, at block 550 (FIG. 5), the system practicing method 500 may select antenna 150 for transmitting and select antenna 155 for receiving.

As shown, block 560 (FIG. 5) relates to transmitting or receiving data from the selected antenna. For example, this may be performed by radio 170 (FIG. 1) working alone or in conjunction with CPU 112 (FIG. 1) and other components to process, encode, and or decode information for transmitting or receiving over antenna 150 in FIG. 1.

Figure 6:
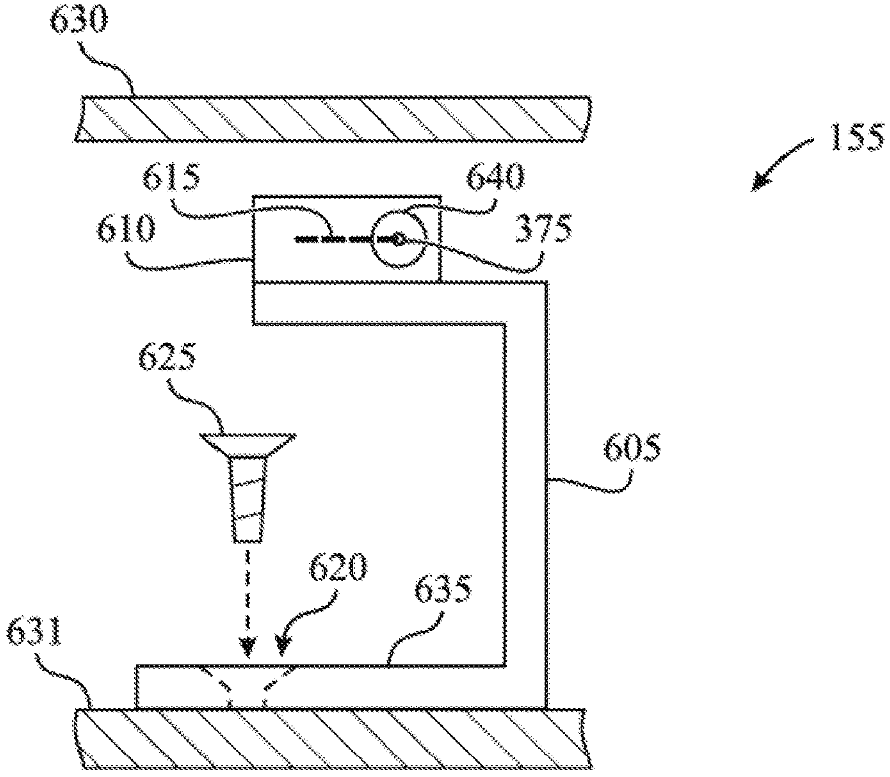
FIG. 6 illustrates a front cutaway view depicting aspects of an antenna configured in accordance with an embodiment of the present disclosure.

FIG. 6 depicts a front view of antenna 155. As shown, antenna 155 comprises a lower portion 635 coupled to a base chassis 631. Base chassis 631 is metallic in some embodiments, and to ensure proper grounding to the base chassis, metallic screw 625 is installed through hole 620. Riser 605 provides elevation away from base chassis 631, which may act as a reflector. Transmission line 375 as shown is going into the page and is a small gauge copper conductor. Transmission line 375 is electrically insulated by shield 640. Transmission line 375 is communicatively coupled to antenna element 615. As shown, antenna element 615 is surrounded by sheath 610. Antenna 155, as shown, is located between plastic chassis assembly 630 and base chassis 631. In the disclosed embodiment, outer body 630 is made of plastic. Plastic chassis assembly 630 generally protects antenna 155 but allows electromagnetic waves to reach antenna 155 and emanate without loss from antenna 155.

Figure 7:
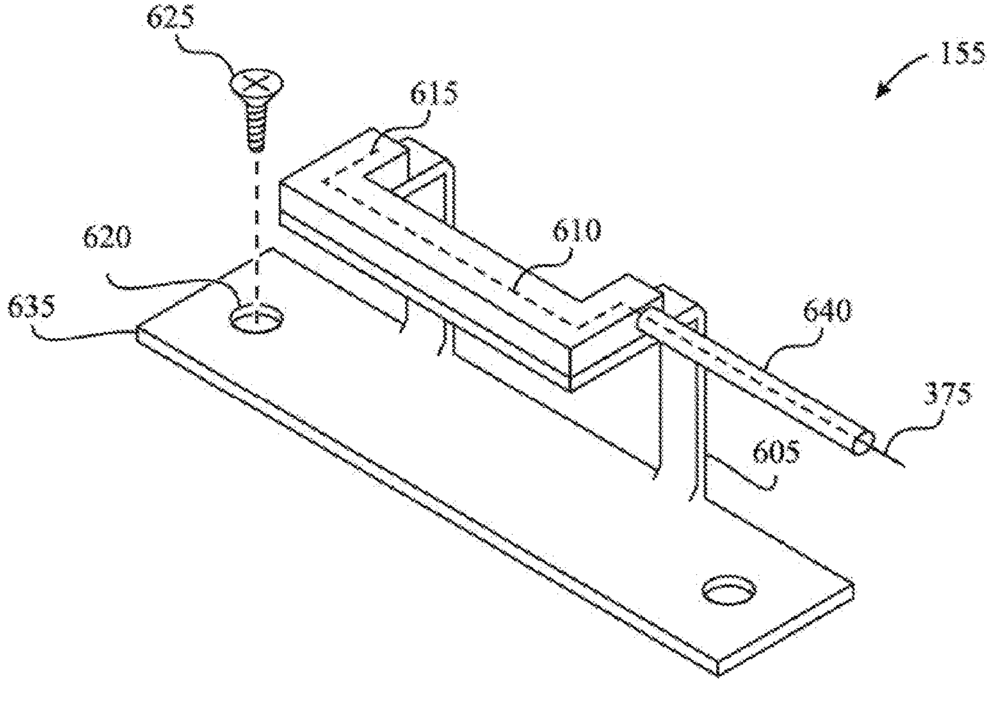
FIG. 7 illustrates an isometric view of the antenna from FIG. 6.

FIG. 7 depicts an additional view of antenna 155. As shown, riser 605 provides elevation away from lower portion 635, and consequently from metallic chassis 631 (FIG. 6). Hole 620 provides an opening for screw 625 to provide electrical contact, and therefore grounding, between lower portion 635 and base chassis 631 (FIG. 6). Shield 640 electrically insulates transmission line 375, which as shown is a small gauge conductor (e.g., a small wire). Antenna element 615 is surrounded by sheath 610.

Figure 8:
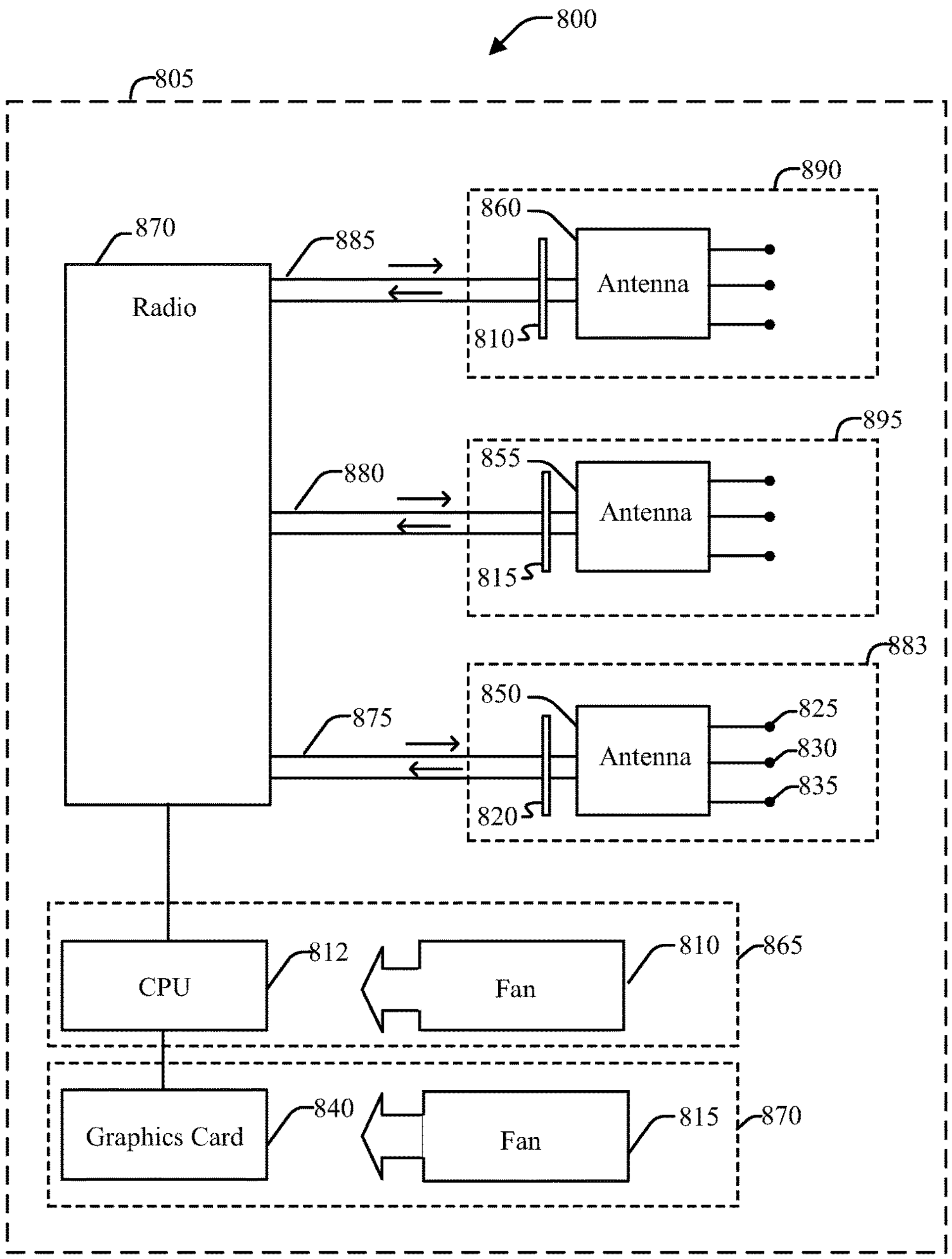
FIG. 8 illustrates a block diagram illustrating aspects of an information handling system including multi-element antennas according to another embodiment of the present disclosure.

FIG. 8 is a block diagram of information handling system 800, which includes antennas that would be positioned according to embodiments of the present disclosure such as described with respect to the previous Figures. Information handling system 800 includes chassis 805 and radio 870 which is communicatively coupled to CPU 812. CPU 812 is communicatively coupled to graphics card 840 and cooled by fan 810. Likewise, graphics card 840 is cooled by fan 815. As shown, fan 810 forms zone 865 which is generally a separate zone from zone 870, which is formed by fan 815. As depicted, fans 810 and 815 each form a zone for cooling one of CPU 812 and graphics card 840. As such, each zone can be controlled separately to meet independently the cooling needs of the CPU and graphics card(s). The ability for the formation of the zones is permitted by the triangular shape of chassis 805 which is similar to the shape of chassis 105 shown in FIG. 1.

In FIG. 8 radio 870 is communicatively coupled via transmission line 885 to antenna 860. Likewise, radio 870 is communicatively coupled to antenna 855 by transmission line 880 and communicatively coupled to antenna 850 by transmission line 875. FIG. 8 depicts that antenna 860 is located proximate to (e.g., at or near) the vertex 890, that antenna 855 is located proximate to vertex 895, and that antenna 850 is located proximate to vertex 883. In contrast, in some embodiments, such antennas can be located on or near (i.e., proximate to) flat surfaces between the vertices as depicted in FIG. 3 by antenna 225.

Antenna 850, as depicted, includes elements 825, 830, and 835. These elements are sub-elements of antenna 850. As shown, antennas 860, 855, and 850 are each associated with one of the reflectors 810, 815, and 820. Reflectors 810, 815, 820 may contribute to antennas 860, 855, 850 performing as directional or sector-based antennas in some embodiments. Chassis 805 may include a material (e.g., metal) that generally blocks electromagnetic waves that are emanating from antennas 850, 855, and 860. In this way, the chassis may act as a shield or reflector.

Figure 9:
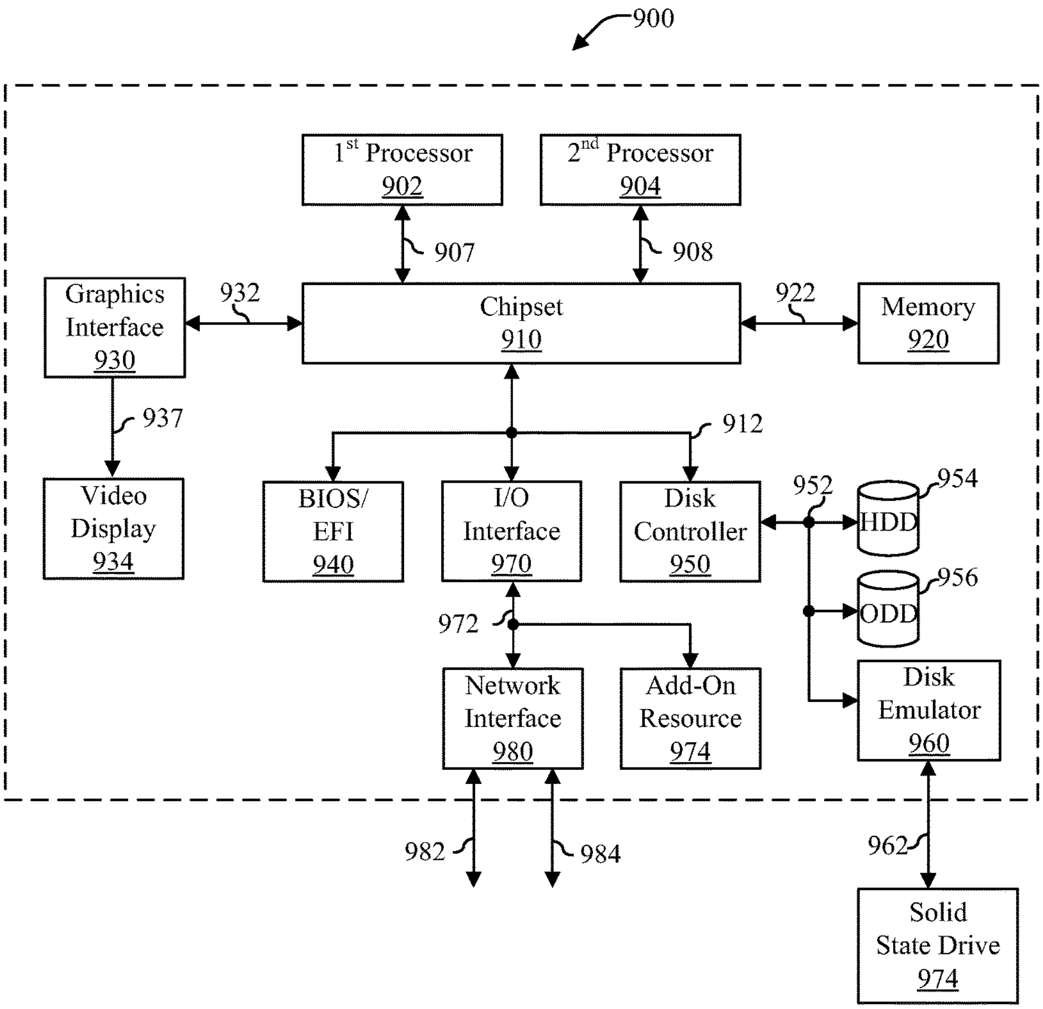
FIG. 9 illustrates a block diagram illustrating aspects of an information handling system according to embodiments of the present disclosure.

FIG. 9 illustrates a generalized embodiment of information handling system 900. Information handling system 900 can include devices or modules that embody one or more of the devices or modules described above, and operates to perform one or more of the methods described above. Information handling system 900 includes a processors 902 and 904, a chipset 910, a memory 920, a graphics interface 930, a basic input and output system/extensible firmware interface (BIOS/EFI) module 940, a disk controller 950, a disk emulator 960, an input/output (I/O) interface 970, and a network interface 980. Processor 902 is connected to chipset 910 via processor interface 907, and processor 904 is connected to chipset 910 via processor interface 908. Memory 920 is connected to chipset 910 via a memory bus 922. Graphics interface 930 is connected to chipset 910 via a graphics interface 932, and provides a video display output 937 to a video display 934. In a particular embodiment, information handling system 900 includes separate memories that are dedicated to each of processors 902 and 904 via separate memory interfaces. An example of memory 920 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 940, disk controller 950, and I/O interface 970 are connected to chipset 910 via an I/O channel 912. An example of I/O channel 912 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 910 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 940 includes BIOS/EFI code operable to detect resources within information handling system 900, to provide drivers for the resources, initialize the resources, and access the resources. BIOS/EFI module 940 includes code that operates to detect resources within information handling system 900, to provide drivers for the resources, to initialize the resources, and to access the resources.

Disk controller 950 includes a disk interface 952 that connects the disc controller to a hard disk drive (HDD) 954, to an optical disk drive (ODD) 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits a solid-state drive 974 to be connected to information handling system 900 via an external interface 962. An example of external interface 962 includes a USB interface, an IEEE 6194 (Firewire) interface, a proprietary interface, or a combination thereof. Alternatively, solid-state drive 974 can be disposed within information handling system 900.

I/O interface 970 includes a peripheral interface 972 that connects the I/O interface to an add-on resource 974 and to network interface 980. Peripheral interface 972 can be the same type of interface as I/O channel 912, or can be a different type of interface. As such, I/O interface 970 extends the capacity of I/O channel 912 when peripheral interface 972 and the I/O channel are of the same type, and the I/O interface translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on a separate circuit board, on an add-in card disposed within information handling system 900, on a device that is external to the information handling system, or a combination thereof.

Network interface 980 represents a NIC disposed within information handling system 900, on a main circuit board of the information handling system, integrated onto another component such as chipset 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of transmitting and receiving data, the method comprising:

operating a first antenna proximate to a first vertex of an information handling system chassis, wherein:

the chassis has a generally triangular profile comprised partly of metal;

the information handling system comprises a CPU, a graphics processor, a power supply, RAM memory, and a network interface device;

a location of the first antenna proximate to the first vertex minimizes operating against a shadow effect of the chassis;

operating a second antenna proximate to a second vertex of the chassis to further minimize the shadow effect by the chassis; and operating a third antenna proximate to a third vertex of the chassis.

2. The method of claim 1, wherein the first antenna and the second antenna each comprise multiple antenna elements.

3. The method of claim 1, wherein the first antenna and the second antenna are omnidirectional.

4. The method of claim 1, further comprising:

operating a radio within the chassis to send information to and receive information from the first antenna, the second antenna, and the third antenna.

5. The method of claim 1, further comprising:

monitoring the operational effectiveness of the first antenna and the second antenna.

6. The method of claim 5, further comprising:

determining which of the first antenna and the second antenna should be used for sending or receiving information; and selecting one of the first antenna or the second antenna based on the determining step.

7. An information handling system comprising:

a chassis comprising a triangular profile comprised partly of metal;

a set of antennas comprising:

a first antenna proximate to a first vertex of the triangular profile to minimize operating against a shadow effect of the chassis;

a second antenna proximate to a second vertex of the triangular profile; and a third antenna proximate to a third vertex of the triangular profile;

a CPU, a graphics processor, a power supply, RAM memory, and a network interface device within the chassis; and a radio communicatively coupled to the first antenna and the second antenna.

8. The information handling system of claim 7, wherein the first antenna and the second antenna are omnidirectional.

9. The information handling system of claim 7, wherein each of the first antenna and the second antenna includes multiple antenna elements.

10. The information handling system of claim 7, wherein the first antenna is mounted under a plastic chassis assembly.

11. The information handling system of claim 10, wherein:

the radio comprises a transceiver enabled for sending and receiving information through each of the first antenna and the second antenna.

12. The information handling system of claim 7, wherein at least one of the first vertex, the second vertex, and a third vertex is chamfered.

13. The information handling system of claim 7, further comprising:

the triangular profile forms a front of the chassis;

a further triangular profile forms a back of the chassis; and each of the first antenna, the second antenna, and a third antenna runs in a direction from the front of the chassis to the back of the chassis.

14. An information handling system comprising:

a triangular chassis partly of metal comprising:

a first vertex;

second vertex, and third vertex;

a first antenna of the one or more antennas is located proximate to the first vertex to minimize operating against a shadow effect of the chassis a second antenna of the one or more antennas is located proximate to the second vertex; and a third antenna of the one or more antennas is located on the triangular chassis opposite to the first or the second vertex; and a CPU, a graphics processor, a power supply, RAM memory, and a network interface device located within the triangular chassis.

15. The information handling system of claim 14, further comprising:

a radio within the chassis to send information to and receive information from the first antenna, the second antenna, and the third antenna.

16. The information handling system of claim 15, wherein one or more of the first vertex, the second vertex, and the third vertex is chamfered.

17. The information handling system of claim 15, wherein the one or more antennas are omnidirectional.

18. The information handling system of claim 15, wherein each of the one or more antennas include multiple antenna elements.

19. The information handling system of claim 14, wherein the triangular chassis further comprises:

a front triangular profile and a rear triangular profile that is generally parallel to the front triangular profile;

wherein the one or more antennas include a first antenna, a second antenna, and a third antenna; and wherein each of the first antenna, the second antenna and the third antenna is located between the front triangular profile and the rear triangular profile.

20. The information handling system of claim 15, further comprising:

a radio;

a first transmission line communicatively coupled to the radio and a first antenna of the one or more antennas;

a second transmission line communicatively coupled to the radio and a second antenna of the one or more antennas; and a third transmission line communicatively coupled to the radio and a third antenna of the one or more antennas.

* * * * *